United States Patent [19]
Warburton et al.

[11] 3,828,119
[45] Aug. 6, 1974

[54] HIGH TEMPERATURE RESISTANT ELECTRICAL CONDUCTOR, AND METHOD OF PRODUCING SAME

[75] Inventors: Joe Allen Warburton; Henry Lewis Wilson, both of Chelmsford, Mass.

[73] Assignee: General Electric Company, New York, N.Y.

[22] Filed: Sept. 21, 1973

[21] Appl. No.: 399,470

[52] U.S. Cl............ 174/121 A, 156/56, 174/DIG. 8, 174/121 SR
[51] Int. Cl............................................. H01b 7/00
[58] Field of Search...... 174/121 R, 121 A, 121 SR, 174/DIG. 8; 156/52, 56

[56] References Cited
UNITED STATES PATENTS

| | | | |
|---|---|---|---|
| 2,251,355 | 8/1941 | Greenleaf...................... | 174/121 A |
| 3,035,113 | 5/1962 | Danchuk...................... | 174/DIG. 8 |
| 3,297,970 | 1/1967 | Jones............................ | 174/DIG. 8 |

Primary Examiner—E. A. Goldberg
Attorney, Agent, or Firm—R. G. Simkins; P. L. Schlamp; S. A. Young

[57] ABSTRACT

A heat resistant insulated electrical wire comprising a metallic conductor, a polymeric organic insulation surrounding the conductor and an overlying covering of a composite body of heat resistant carded staple fiber. The composite body of carded fiber covering the polymeric insulation is impregnated with a bonding agent and comprises at least two layers of carded fiber slivers with an intermediate strand matrix of heat shrunk organic filaments contracted around the inner layer of sliver of carded fiber about the polymeric insulation and thereby firmly gripping the polymeric insulation and securely affixing the bonded composite body of carded staple fiber to the insulated conductor. The disclosure also includes a method of producing the electrical wire product.

21 Claims, 2 Drawing Figures

PATENTED AUG 6 1974 3,828,119

HIGH TEMPERATURE RESISTANT ELECTRICAL CONDUCTOR, AND METHOD OF PRODUCING SAME

BACKGROUND OF THE INVENTION

Asbestos and other high temperature resistant fibers are commonly applied over polymeric or elastomeric electrical insulating materials on metal conductors in wires and cables designed for services wherein exposure to high temperatures or fire is a normal or possible occurrence. This type of wire and cable having an insulating covering or component of asbestos or other heat resistant fiber is commonly used in appliances and other devices containing heating elements, such as cooking stoves or ovens, dish washers and clothes dryers, and in any service requiring resistance to heat or flame conditions. A variety of such wire and cable constructions are shown in the U.S. Pat. literature, for example: Nos. 2,038,377; 2,127,122; 2,182,667; 2,185,558; 2,226,590; 2,231,606; 2,234,560; 2,335,077; and 2,382,423.

However, it is generally difficult to effectively affix or adhere staple fibers to the surfaces of polymeric materials comprising the insulating substratum unless the polymeric composition can be conveniently and effectively reduced to a softened plastic and tacky state which is receptive to the adherence of fibrous materials through the application of heat or solvents, or an adhesive agent is used. This need for effective adherence between staple fibers and polymeric materials in insulated conductors has prompted a variety of constructions or systems for wires and cable assemblies designed to contain the fibrous components within the unit, including for example, adhesives, enclosing textile or elastomer jackets, or forming the asbestos or other staple fiber into continuous strands with organic carrying fiber such as cotton and applying the strands thereof by twisting, braiding or weaving them about the insulated conductor.

Although prior art systems or constructions have been somewhat effective in preserving the unity of composite wire and cable assemblages containing staple fiber, their integrity frequently has not been sufficient to resist relative slippage or axial dislocation between the body of fibrous material and the underlying polymeric insulation. Slippage or axial dislocation of the overlying fibrous material relative to the polymeric insulation is a particularly significant problem upon stripping the wire or cable, and is especially troublesome when the stripping is accomplished with high speed automatic wire stripping apparatus employing mechanical means such as cutting blades and gripping fingers which very rapidly grab the wire product, and then cut and pull the strippable material from the conductor. This high speed handling and pulling of the insulated wire and resultant abrupt stresses imposed during cutting and stripping away of the unwanted material tend to loosen the body of fibers and induce slippage between the fibers and the underlying polymeric insulation and thereby produce uneven ends as between these components on the stripped sections.

Moreover, this problem of securing fibrous materials to the polymeric insulation and of the relative slippage and dislocation therebetween upon stripping is substantially accentuated and becomes particularly critical when the polymeric insulation comprises a polymeric material which is resistant to solvents and has relatively slick and low friction surface characteristics such as typical silicon elastomers, fluorinated ethylene (Teflon) and nylon type polyamides. Flexible and elastic polymers of this type are especially resistant to adherence with most materials, including some adhesives, and in particular staple fiber of relatively hard or harsh characteristics such as asbestos or glass.

SUMMARY OF THE INVENTION

This invention comprises a method of applying a mass of loose staple fiber, such as a sliver of carded fiber, superimposed over an insulation of a polymeric material exhibiting slick surface characteristics, and securely affixing the fiber to the surface of the underlying polymeric substratum so that the resultant assemblage of fiber and polymer effectively resist separation and relative slippage or movement, and the novel product of the method.

The invention includes applying the staple fibrous material to the polymeric insulation surrounding the conductor in at least two layers or laminae of carded slivers, providing a strand matrix of shrinkable organic filaments intermediate to the layers of carded fiber making up the composite fiber body, shrinking the organic filaments forming the strand matrix to contract the matrix around the inner layer or layers of carded fiber and the underlying polymeric insulation, and bonding the staple fiber together to form a composite body by impregnating the fibers of each layer or lamina with a bonding agent.

OBJECTS OF THE INVENTION

It is a primary object of this invention to provide a novel and improved high temperature resistant electrical conductor having a composite insulation comprising distinct phases or components of a dielectric polymeric material and heat resistant staple fiber which effectively resist separation and slippage or movement relative to each other, and a method of producing same.

It is also an object of this invention to provide an electrical conductor having a silicone elastomer or similar slick surfaced polymeric insulation with an overlying covering of a body of carded asbestos fiber which is securely affixed to the surface of the underlying polymeric insulation.

DETAILED DESCRIPTION OF PREFERRED EMBODIMENTS

Figure 1:
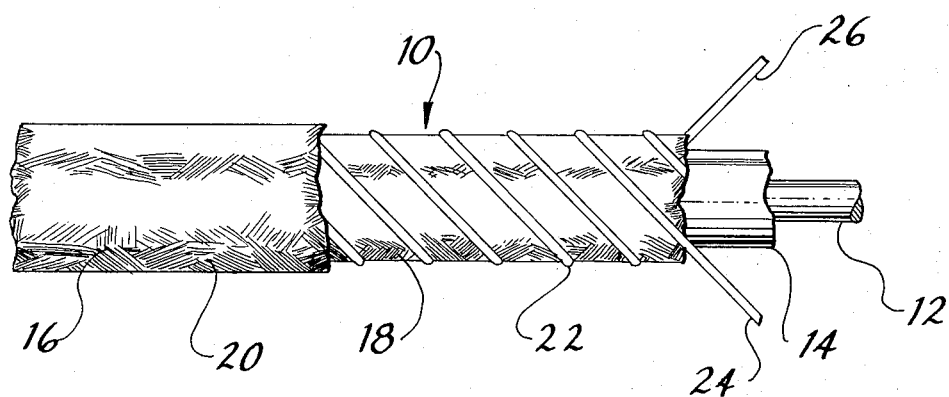
FIG. 1 comprises an elevational view of a section of an electrical conductor insulated in accordance with one embodiment of the composite insulation of this invention; and, FIG. 2 comprises an elevational view of a section of an electrical conductor insulated in accordance with another embodiment of the composite insulation of this invention.

Referring to the drawing, the high temperature resistant, insulated electrical wire 10 of this invention and shown in FIG. 1, includes a metallic conductor 12, and a combination of insulations comprising a polymeric dielectric insulation 14 and an overlying thermal insulating cover of a composite body or mass of staple fibers 16.

The polymeric dielectric insulation 14 surrounding the conductor 12 comprises a polymer composition having slick, low friction surface characteristics, for example, a silicone elastomer, polytetrafluoroethylene, or fluorinated ethylene propylene such as DuPont's TEFLONS or Allied Chemical's HALON, nylon type polyamides, and the like organic materials suitable for use as electrical insulations.

Superimposed over the polymeric insulation 14, is a body of staple fiber 16 having heat and flame resisting properties, such as asbestos, silica fiber, glass fiber, refractory fibers comprising alumina and silica, or high temperature resistant organic fibers such as DuPont's NOMEX nylon, and any combinations thereof. The body of staple fiber 16 overlying and covering the polymeric insulation 14 is a composite of at least two layers or laminae of slivers or mats of carded fiber comprising an inner layer 18 which is immediately adjacent the surface of the polymeric insulation, and an outer layer 20 which is substantially coextensive with the inner fiber layer. Each of said components of the fibrous body preferably comprises a carded sliver or combed mat of staple fibers and is folded or wrapped around the polymeric insulation surrounding the conductor.

A strand matrix or web 22 of heat shrinkable organic filaments is provided intermediate the layers or laminae of the body of staple fibers 16. In the embodiment shown in FIG. 1, the strand matrix or web 22 is formed by helically winding one or more filaments, such as 24 and 26, in spaced turns over the inner layer 18 of the fibrous body 16 and around it and the underlying polymer insulated conductor. The helical windings can be formed with one strand or a plurality of parallel wound or cross wound strands. The strand windings or convolutions are preferably so arranged and located with respect to each other as to provide substantial open areas or interstices between the turns of the strands.

Heat shrinkable filaments for the matrices or webs of this invention preferably can be composed of DACRON (DuPont) polyester or nylon type polyamide, although other heat shrinkable organic filaments of suitable tensile strength and durability will suffice.

Upon the application of heat, the heat shrinkable filaments deployed as a matrix or web 22 around the inner layer 18 of staple fiber and the polymer insulated conductor, shrink and contact around the underlying assemblage. The constriction of the matrix or web 22 firmly grips and holds the inner layer 18 of fiber about the polymeric insulation 14 and conductor 12 and thereby securely affixes the staple fiber to the surface of the insulation regardless of the nature of its surface properties.

The heat to effect the necessary shrinkage of the filaments of the matrix can be derived from the step of drying the liquid impregnant, or solvent therefor, with elevated temperature, or the heat for the induced shrinking may comprise a separate operation.

Following the formation of the strand matrix or web 22, the outer or subsequent layer of staple fiber, such as the illustrated layer 20, is folded or wrapped over the assemblage including the inner fibrous layer 18 and the strand matrix or web 22.

It is within the scope of this invention to provide the assemblage of the high temperature resistant, insulated electrical wire with three or more layers or laminae of staple fiber comprising the composite body of fiber. For example, the assemblage can be constructed with two or more adjacent layers of fiber applied to the polymeric insulation prior to the strand matrix or web and a single outer layer of fiber, or with a single inner layer of fiber between the polymeric insulation and the strand matrix or web and two or more outer layers of fiber covering the strand matrix. Also, multiple layers or laminae of carded fiber can be applied both under and over the strand matrix or web. It is additionally within the scope and concept of this invention to provide a series of strand matricies or webs alternating with layers of staple fiber.

The staple fiber of the individual layers or laminae and the layer or laminae thereof are all bonded together into a continuous composite fibrous body containing the strand matrix or web embedded therein by impregnating the fibers with a suitable bonding agent in liquid form. The impregnating treatment with the bonding agent can be administered stepwise to each layer of fiber following its application to the polymer insulated conductor, to several layers together, or to the completed assemblage with all fiber layers in situ about the polymer insulated conductor and containing one or more intermediate strand matrices or webs embedded therebetween. The impregnation with a bonding agent integrates the staple fiber into a continuous body or composite system which embraces the strand matrix or web and extends through its open pattern.

The bonding impregnant may comprise any bonding agent or material possessing the necessary or desired properties for the requirements of the electrical conductor product, such as resistance to heat and flame. Solvent dispensible compositions comprising silicones or halogenated rubbers are preferred, but other well known impregnants for asbestos and inorganic fiber can be used such as the materials disclosed in several of the above-noted United States patents.

An example of a preferred saturant or bonding impregnant for the fibrous body for use in this invention would be a methyl phenyl polysiloxane such as General Electric's SR82, thinned with toluene or other suitable solvent to an effective viscosity for penetration and saturation. Another example of a preferred bonding impregnant is disclosed in allowed application for patent Ser. No. 317,691, filed Dec. 22, 1973, of Paul O. Nicodemus and Henry L. Wilson and assigned to the same assignee as this invention. This composition comprises the combination of the following ingredients in the appropriate ranges given in parts by weight.

| | |
|---|---|
| Halogenated rubber | 15 – 25 |
| Halogenated polyphenyl | 25 – 35 |
| Hydrated alumina | 30 – 40 |
| Halogenated phthalic anhydride | 3 – 9 |
| Antimony trioxide | 3 – 9 |
| Phosphate ester | 0 – 9 |
| Aluminum stearate | 0 – 1 |

A specific composition comprises the following ingredients dissolved or dispensed in about 147 parts of toluene per 100 parts by weight of the combined ingredients of:

| | Parts By Wt. | Percent |
|---|---|---|
| Chlorinated natural rubber | 17.7 | 7.1 |
| Tricresyl phosphate | 5.9 | 2.4 |
| Hexabromo diphenyl | 29.3 | 11.7 |
| Hydrated alumina | 35.0 | 14.0 |

-Continued

| | | |
|---|---|---|
| Tetrabromo phthalic anhydride | 5.9 | 2.4 |
| Antimony trioxide | 5.9 | 2.4 |
| Aluminum stearate | 0.3 | 0.1 |
| Toluene | — | 59.9 |

A typical method of producing the novel and improved high temperature resistant insulated electrical conductor products of this invention comprises the following operation. Initially the polymer insulation is formed about the metallic conductor in a conventional manner such as by extrusion molding a silicone elastomer dielectric insulation about a copper conductor. Thereafter an inner sliver or mat of carded asbestos fiber is formed around the polymeric insulated conductor and the strand matrix or web is applied by windings spaced turns of heat shrinkable DACRON polyester filaments about the assemblage. Next an outer sliver or mat of carded asbestos fiber is formed over the assemblage including the strand matrix or web, and the fibers are treated in situ with the above impregnant by immersing the assemblage into the liquid dispensed composition. FOllowing the impregnation, the treated product is heated to a temperature of 350° to 450° F in circulating air oven to accelerate the evaporation of the toluene solvent and also to cause the shrinking of the filaments and contraction of the strand matrix around the inner layer of staple fiber, for thereby securely affixing the inner layer of fiber to the underlying silicone insulation on the conductor and at the same time bonding the fiber of each layer or sliver into a continuous integrated body.

Figure 2:
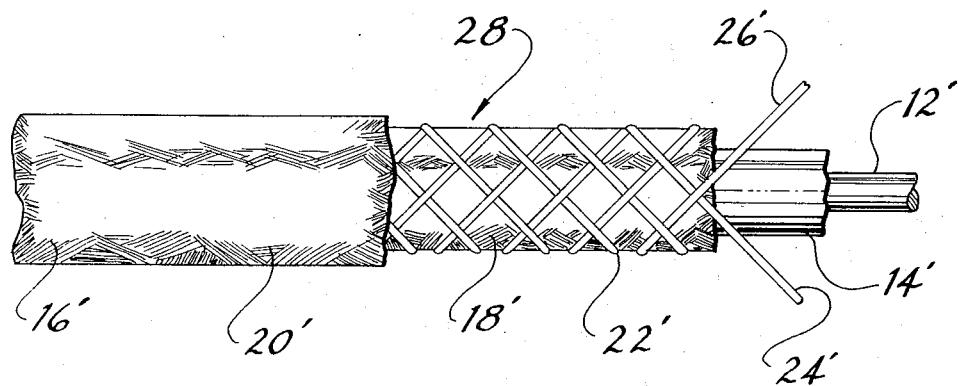

Another embodiment of this invention is shown in FIG. 2 of the drawing wherein like numerals are used to illustrate the same parts as in FIG. 1. The insulated wire 28 of the embodiment of FIG. 2 comprises a metal conductor 12', a surrounding polymeric insulation 14', and an overlying composite body 16' of staple fiber. The fibrous composite body 16' is similarly formed of at least two layers or laminae 18' and 20' of slivers or mats of carded staple fiber. In this embodiment the intermediate strand matrix or web 22' is formed with a plurality of heat shrinkable organic filaments, 24', 26' and more, braided about the inner layer of fiber and polymer insulated conductor in an open pattern or braid structure substantially as illustrated. In all other respects the construction and method of manufacture of this embodiment can be the same as those of the first-described embodiment.

Although the invention has been described with reference to certain specific embodiments thereof, numerous modifications are possible without departing from the invention disclosed, and it is desired to cover all modifications falling within the spirit and scope of the invention.

What we claim as new and desire to secure by letters Patent of the United States is:

1. A high temperature resistant insulated electrical wire comprising the combination of:
   a. a metallic conductor;
   b. a dielectric polymeric insulation selected from the group consisting of silicone elastomer, fluorinated ethylene, and nylon polyamide surrounding said metallic conductor; and,
   c. a composite body of heat resistant carded staple fiber bonded together with a heat resistant impregnant overlying said polymeric insulation, said composite body of fiber comprising at least two layers of carded fiber and having an intermediate strand matrix of at least one heat shrunk organic filament selected from the group consisting of polyester and polyamide contracted around at least one layer of the carded fiber and the polymeric insulation on the conductor for thereby firmly gripping the polymeric insulation surrounding the conductor and securing the bonded body of carded fiber to the polymer insulation.

2. The high temperature resistant insulated electrical wire of claim 1, wherein the heat resistant carded staple fiber is selected from the group consisting of asbestos fiber, silica fiber, alumina silica fiber, glass fiber, high temperature polyamide fiber, and mixtures thereof.

3. The high temperature resistant insulated electrical wire of claim 1, wherein the intermediate strand matrix of at least one heat shrunk filament comprises spaced turns of at least one helically wound filament.

4. The high temperature resistant insulated electrical wire of claim 1, wherein the intermediate strand matrix comprises a plurality of heat shrunk filaments comprising an open braid of filaments.

5. The high temperature resistant insulated electrical wire of claim 1, wherein the bonding heat resistant impregnant comprises a halogenated rubber.

6. The high temperature resistant insulated electrical wire of claim 1, wherein the bonding heat resistant impregnant comprises a methyl phenyl polysiloxane.

7. A high temperature resistant insulated electrical wire comprising the combination of:
   a. a metallic conductor;
   b. a silicone elastomer insulation surrounding said metallic conductor; and,
   c. a composite body of carded asbestos fiber bonded together with a heat resistant impregnant overlying said silicone elastomer insulation, said composite body of asbestos fiber comprising at least two layers of carded asbestos and having an intermediate strand matrix of at least one heat shrunk polyester filament contracted around at least one layer of the carded asbestos fiber and the silicone insulation and conductor for thereby firmly gripping the silicone insulation surrounding the conductor and securing the bonded body of carded asbestos to the silicone insulation.

8. The high temperature resistant insulated electrical wire of claim 7, wherein the intermediate strand matrix of at least one heat shrunk polyester filament comprises spaced turns of at least one helically wound polyester filament.

9. The high temperature resistant insulated electrical wire of claim 7, wherein the intermediate strand matrix comprises a plurality of heat shrunk polyester filaments comprising an open braid of polyester filaments.

10. The high temperature resistant insulated electrical wire of claim 7, wherein the bonding heat resistant impregnant comprises a chlorinated rubber.

11. The high temperature resistant insulation electrical wire of claim 7, wherein the bonding heat resistant impregnant comprises a methyl phenyl polysiloxane.

12. A method of manufacturing a high temperature resistant insulated electrical wire consisting of an assemblage including a metallic conductor, a surrounding dielectric polymeric insulation having slick surface characteristics, and an overlying composite body of bonded heat resistant carded staple fiber, comprising the steps of:

a. forming a dielectric polymeric insulation about a metallic conductor;

b. applying a sliver of carded heat resistant staple fiber around said polymeric insulation on the conductor;

c. forming a strand matrix of at least one heat shrinkable organic filament surrounding said sliver of carded fiber around the polymeric insulation;

d. applying another sliver of carded heat resistant staple fiber over said strand matrix of at least one filament surrounding the sliver of carded fiber around the polymeric insulation;

e. impregnating the slivers of carded staple fiber with a bonding impregnant in liquid form; and, f. heating the resultant assemblage of conductor, surrounding polymeric insulation and overlying body of impregnated carded staple fiber to contract the strand matrix of at least one heat shrinkable organic filament around said assemblage for thereby firmly gripping the polymeric insulation and securing the impregnate bonded body of carded fiber to the polymeric insulation.

13. The method of manufacturing a high temperature resistant insulated electrical wire of claim 12, wherein the strand matrix of at least one heat shrinkable organic filament is formed by helically winding at least one filament in spaced turns around the sliver of carded fiber on the polymeric insulation.

14. The method of manufacturing a high temperature resistant insulated electrical wire of claim 12, wherein the strand matrix comprises a plurality of heat shrinkable organic filaments and is formed by braiding the filaments around the sliver of carded fiber on the polymeric insulation in an open pattern.

15. The method of manufacturing a high temperature resistant insulated electrical wire of claim 12, wherein the slivers of carded staple fiber are impregnated with a halogenated rubber.

16. Th high temperature resistant insulated electrical wire of claim 12, wherein the bonding heat resistant impregnant comprises a methyl phenyl polysiloxane.

17. A method of manufacturing a high temperature resistant insulated electrical wire consisting of an assemblage including a metallic conductor, a surrounding dielectric silicone elastomer insulation, and an overlying composite body of bonded carded asbestos fiber comprising the steps of:

a. forming a silicone elastomer insulation about a metallic conductor;

b. applying a silver of carded asbestos fiber around said silicone insulation on the conductor;

c. forming a strand matrix of at least one heat shrinkable polyester filament surrounding said sliver of carded asbestos fiber around the silicone insulation.

d. applying another sliver of carded asbestos fiber over said strand matrix of polyester filaments surrounding the sliver of carded asbestos fiber around the silicone insulation;

e. impregnating the slivers of carded asbestos fiber with a bonding impregnant in lquid form; and, f. heating the resultant assemblage of conductor, surrounding silicone insulation and overlying body of impregnated carded asbestos fiber to contract the strand matrix of at least one heat shrinkable polyester filament around the assemblage for thereby firmly gripping the silicone insulation and securing the impregnate bonded body of carded asbestos fiber to the silicone insulation.

18. The method of manufacturing a high temperature resistant insulated electrical wire of claim 17, wherein the strand matrix of at least one heat shrinkable polyester filament is formed by helically winding at least one filament in spaced turns around the sliver of carded asbestos fiber on the silicone insulation.

19. The method of manufacturing a high temperature resistant insulated electrical wire of claim 17, wherein the strand matrix comprises a plurality of heat shrinkable polyester filaments and is formed by braiding the filaments around the sliver of carded asbestos fiber on the silicone insulation in an open pattern.

20. The method of manufacturing a high temperature resistant insulated electrical wire of claim 17, wherein the slivers of carded asbestos fiber are impregnated with a chlorinated rubber.

21. The method of manufacturing a high temperature resistant electrical wire of claim 17, wherein the slivers of carded asbestos fiber are impregnated with a methyl phenyl polysiloxane.

* * * * *